Patented Apr. 8, 1952

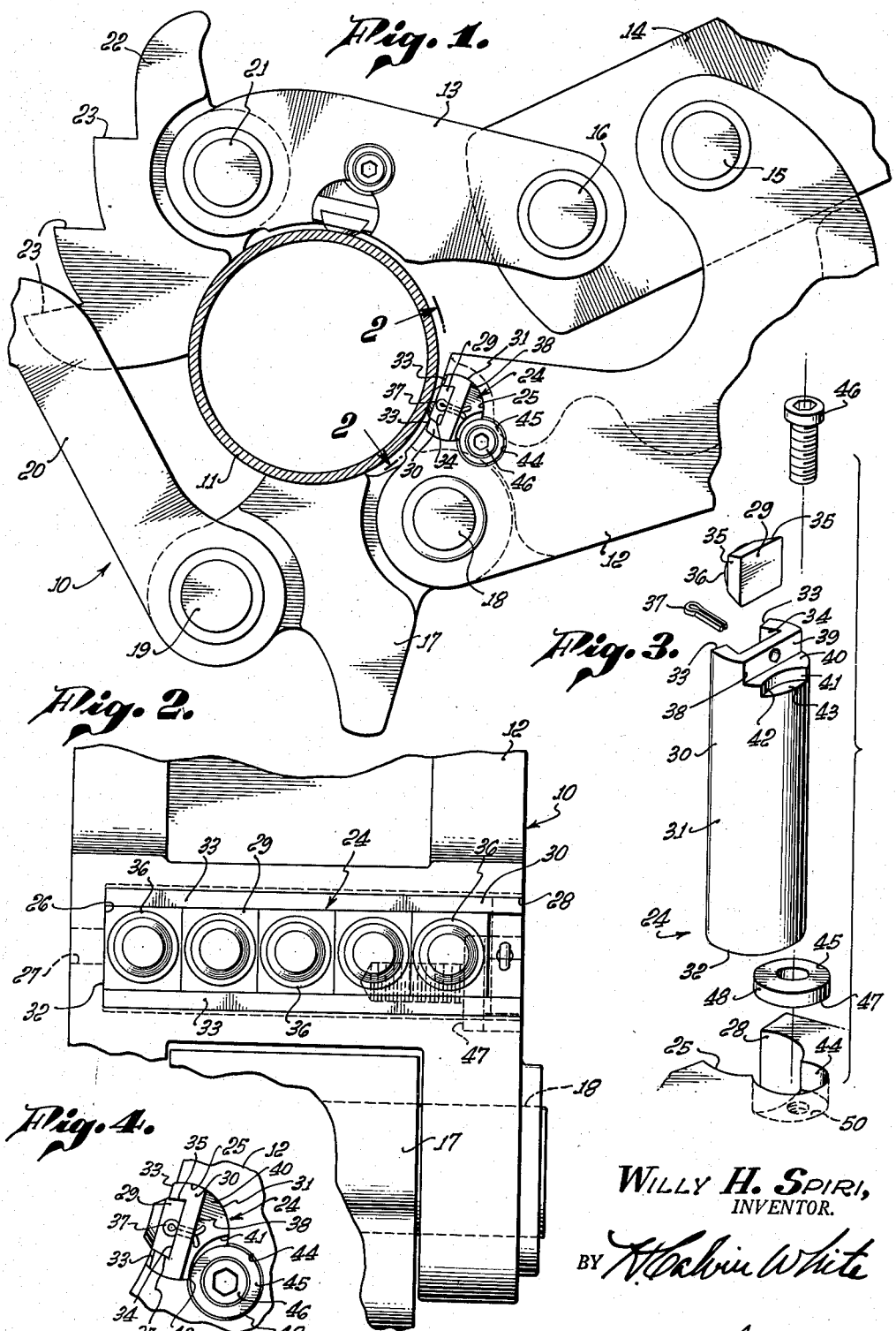

2,591,887

UNITED STATES PATENT OFFICE 2,591,887

MOVABLE GRIPPING UNIT FOR PIPE WRENCHES

Willy H. Spiri, Whittier, Calif., assignor to Abegg & Reinhold Co., Los Angeles, Calif., a corporation of California Application June 8, 1951, Serial No. 230,530

8 Claims. (Cl. 81—180)

This invention relates to tools for gripping well pipe, and in certain respects is particularly directed to the provision of improved pipe gripping tongs.

Tools embodying the present invention comprise essentially a body adapted to extend about a pipe, and a plurality of gripping units carried by the body for engaging and gripping the pipe. The body may include a number of sections or jaws carrying the gripping units, and an actuating lever connected to the jaws and adapted by swinging movement to tighten the jaws about the pipe. To permit use of the tool on pipes of different sizes, the gripping units are mounted for positional self-adjusting movement relative to their carrying jaws or body sections. At the same time, the gripping units are so mounted to the body sections that the gripping forces are transmitted through the units and to the pipe with equal effectiveness in all adjusted conditions of the units. This result is attained by mounting each unit within a partial cylindrical recess in the corresponding jaw, to rotate within that recess in adjusting to the pipe.

The general object of the invention is to provide improvements in the manner of retaining a movable gripping unit of the above type in active position within a carrying jaw or body section. Particularly contemplated is a method of retaining the unit which serves both to positively prevent accidental removal of the unit from the body section, and effectively limit movement of the unit in adjusting to the pipe, and yet which permits removal of the unit when desired with maximum facility. More particularly, a single element, removably attachable to the body and preferably taking the form of a simple circular washer, may serve both as a retaining element and a stop for limiting rotational adjusting movement of the unit. The washer may be attachable to the body by a single fastener, so that disconnection of that one fastener frees the gripping unit for removal from the body. To limit rotational adjusting movement of the gripping unit in use, the unit may have means projecting axially therefrom alongside the retaining element or washer and engageable with the element upon predetermined rotation of the unit. These projecting means are preferably formed by providing the gripping unit with an end recess, into which the retaining element projects, and defined by a peripheral wall or stop shoulder engageable with the retaining element. Preferably, the recess is arcuate and of a radius greater than the circular retaining element.

Each gripping unit may comprise a carrier member adapted to be movably carried by the tool body, and one or more pipe engaging gripping elements removably mounted to the carrier. Certain particular features of the invention involve a manner of mounting such a unit to a tool body so that the gripping members are easily removable from the carrier, preferably at the same end as that at which the carrier is engaged by its retaining element, while the carrier itself is retained in the body. This result may be attained by mounting the gripping members within a dove-tail slot in the carrier, which slot is accessible at the end of the body and at a location offset from the retaining element by which the carrier is held in its jaw recess.

The above and other features and objects of the present invention will be better understood from the following detailed description of the typical embodiment illustrated in the accompanying drawing, in which:

Fig. 1 is a plan view of well pipe gripping tongs embodying the present invention, and shown as applied to the pipe;

Fig. 2 is an enlarged view showing the inner side of one of the tong jaws and taken on line 2—2 of Fig. 1;

Fig. 3 is an exploded perspective view of one of the movable pipe gripping units and the elements by which it is retained in assembled condition within a tong jaw; and Fig. 4 is an enlarged fragmentary view of one of the gripping units and its retaining element, and showing especially the manner in which the retaining element limits rotation of the gripping unit.

In Fig. 1, the tongs 10 are shown applied in gripping condition about a well pipe 11. The tong body is of generally conventional construction, including a pair of main jaws 12 and 13 pivotally connected to the usual elongated actuating lever 14 at 15 and 16 respectively. A latch mounting jaw 17 is pivotally mounted to an outer end of jaw 12, as by a pivot pin 18, and in turn pivotally carries at 19 the latch element 20. Jaw 13 pivotally carries at 21 a latch lug element 22, having a number of shoulders 23 selectively engageable by latch 20 to fasten the tongs about pipes of different diameters.

Each of the two main jaws 12 and 13 carries a movable pipe gripping unit 24, movably mounted within a partial cylindrical recess 25 extending along the inner side of the jaw. These recesses 25 extend axially of the pipe being gripped, and are open axially along their inner sides to permit projection of the gripping unit inwardly into engagement with the pipe. Each jaw forms a transverse wall 26 extending across one end of its recess 25, and against which the corresponding gripping unit 24 seats. A relatively small bore 27 may extend through this transverse end wall of the recess to the exterior of the jaw. The opposite end 28 of each recess 25 is open to permit insertion and removal of the gripping unit.

As best seen in Fig. 3, each gripping unit includes a number of pipe engaging gripping elements 29, and a carrier member 30 to which the gripping elements are mounted. The carrier member has an outer partial cylindrical surface 31 of a diameter corresponding to jaw recess 25 and engaging the wall of that recess to guide the carrier member for relative rotational movement. The engaging cylindrical surfaces of the carrier and the jaw recess are of a circular extent greater than 180 degrees, to prevent removal of the carrier from the recess other than by axial sliding movement from its open end 28. At one end, carrier 30 has a transverse end surface 32 engageable with the transverse end wall 26 of the jaw recess to position the carrier within the recess.

Along its inner side, carrier 30 presents a pair of flat axially extending inner surface areas 33, between which is formed an axially extending inwardly opening dove-tail slot 34. Gripping elements 29 have angular sides 35 engageable with the sides of dove-tail slot 34 to guide the gripping elements for sliding movement axially into the carrier slot. The inner gripping faces of elements 29 may typically form circular inwardly projecting gripping ridges 36 for engaging the pipe. The gripping elements are retained within their carrier slot by a cotter key 37 attachable to the carrier and projecting into the slot at the open end of the jaw recess 25.

At the open end of recess 25, or at the upper end of the carrier as seen in Fig. 3, the carrier is cut away outwardly of slot 34 to form an end recess 38 into which the ends of cotter key 37 project. This recess 38 is defined by a wall surface 39 extending axially and parallel to the inner surface of gripper mounting slot 34, and by a transverse bottom wall surface 40. Beneath an outer portion of surface 40, the carrier 31 is further cut away to form an arcuate recess 41 for receiving a carrier retaining element. This recess 41 is defined by a partial cylindrical side wall surface 42 extending axially of the carrier, and a transverse bottom wall surface 43.

At a location opposite and outwardly of arcuate carrier recess 41, the jaw has a partial cylindrical recess 44 opening into the main jaw recess 25. An annular washer-like retaining element 45 is receivable within jaw recess 44 and removably attachable to the jaw by screw 46. This washer projects into arcuate carrier recess 41 to engage the carrier in a manner both retaining it within jaw recess 25 and positively limiting its rotational movement within that recess.

More specifically, retaining element 45 has a transverse flat undersurface 47 engageable with correspondingly transverse surface 43 of the carrier to prevent axial sliding movement of the carrier from its jaw recess. About its periphery, retaining element 45 has an outer cylindrical surface 48, of a radius less than the cylindrical side wall surface 42 of carrier recess 41, and engageable with surface 42, as at 49 in Fig. 4, to limit rotation of the carrier. The retaining element is positioned by engagement of its transverse undersurface 47 with a transverse bottom wall 50 of the auxiliary recess jaw 44. This bottom wall 50 of recess 44 is formed to so position the retaining element as to avoid tight clamping of the retaining element against carrier surface 43, and thus assure rotatability of the carrier.

The tongs are used in the same manner as conventional tongs, the jaws being positioned about pipe 11, latch 20 engaged with latch lug 22, and lever 14 then swung in a direction to tighten the jaws about the pipe. As the tongs are tightened about a particular pipe, the gripping units 24 rotate within their jaw recesses 25 to positions assuring proper engagement of their gripping faces with the pipe. As pointed out previously, the extent of this rotational movement in either direction is positively limited by engagement of the carrier surface 42 with the retaining element 45, so that the gripping elements at all times face generally inwardly toward the pipe. If it becomes necessary to replace an entire gripping unit, the corresponding retaining element 45 may be removed, permitting sliding movement of the unit axially outwardly from its recess. On the other hand, if only the gripping elements 29 need replacement, cotter key 37 may be easily removed, without removal of the retaining element or carrier member, and the gripping elements will then be free to slide axially outwardly from their guide slot 34.

I claim:

1. A well pipe gripping tool comprising a body having a portion to be received at a side of the pipe and containing a partial cylindrical recess extending axially of the pipe and open along an inner side facing the pipe, a gripping unit carried by the body having a partial cylindrical portion received and guided for rotational movement in said recess, said recess having an open end from which said unit is slidable in an axial direction out of engagement with the body, and a retaining element removably attachable to the body and having a portion extending transversely of said recess near said open end thereof and engageable by said unit to maintain it against removal in said axial direction, said unit having a portion projecting in said axial direction alongside said element and positioned to engage the element upon rotational movement of the unit to limit said movement.

2. A well pipe gripping tool comprising a body having a portion to be received at a side of the pipe and containing a partial cylindrical recess extending axially of the pipe and open along an inner side facing the pipe, a gripping unit carried by the body having a partial cylindrical portion received and guided for rotational movement in said recess, said recess having an open end from which said unit is slidable in an axial direction out of engagement with the body, and a retaining element removably attachable to the body and having a portion extending transversely of said recess near said open end thereof and engageable by said unit to maintain it against removal in said axial direction, said unit having a recess opening in said axial direction within which said portion of the element is received, and said unit having a wall extending along and defining said recess and adapted to engage the element upon rotation in different directions to limit said rotation.

3. A well pipe gripping tool comprising a body having a portion to be received at a side of the pipe and containing a partial cylindrical recess extending axially of the pipe and open along an inner side facing the pipe, a gripping unit carried by the body having a partial cylindrical portion received and guided for rotational movement in said recess, said recess having an open end from which said unit is slidable in an axial direction out of engagement with the body, and a circular retaining element removably attachable to the body and having a portion extending transversely of said recess near said open end thereof and engageable by said unit to maintain it against removal in said axial direction, said unit having an arcuate recess within which said portion of the element is received, and said unit having an arcuate wall of a radius greater than said circular element extending along and defining said recess and adapted to engage the element upon rotation in different directions to limit said rotation.

4. A well pipe gripping tool comprising a body having a portion to be received at a side of the pipe and containing a partial cylindrical recess extending axially of the pipe and open along an inner side facing the pipe, a carrier having a partial cylindrical portion received and guided for rotational movement in said recess, said recess having an open end through which said carrier is slidable in an axial direction out of engagement with the body, a retaining element removably attachable to the body and having a portion extending across said open end of the recess engageable by said carrier to maintain it against removal in said axial direction, a gripping member carried by said carrier, and means for removably attaching said gripping member to the carrier and positioned for access to attach or remove the member while said retaining element remains attached to the body.

5. A well pipe gripping tool comprising a body having a portion to be received at a side of the pipe and containing a partial cylindrical recess extending axially of the pipe and open along an inner side facing the pipe, a carrier having a partial cylindrical portion received and guided for rotational movement in said recess, said recess having an open end through which said carrier is slidable in an axial direction out of engagement with the body, a retaining element removably attachable to the body and having a portion extending across said open end of the recess engageable by said carrier to maintain it against removal in said axial direction, a gripping member carried by said carrier, and means for removably attaching said gripping member to the carrier and positioned for access to attach or remove the member while said retaining element remains attached to the body, said carrier having portions projecting in said axial direction alongside said element and positioned to engage the element upon rotation in different directions to limit said rotation.

6. A well pipe gripping tool comprising a body having a portion to be received at a side of the pipe and containing a partial cylindrical recess extending axially of the pipe and open along an inner side facing the pipe, a carrier having a partial cylindrical portion received and guided for rotational movement in said recess, said recess having an open end through which said carrier is slidable in an axial direction out of engagement with the body, a retaining element removably attachable to the body and having a portion extending across said open end of the recess engageable by said carrier to maintain it against removal in said axial direction, said carrier containing an axial slot at an inner side facing the pipe and having an open end facing in said axial direction, a plurality of gripping elements mounted in said slot and slidable therefrom in said axial direction, a fastener removably attachable to the carrier at said open end of its slot to prevent removal of the gripping elements and positioned for access while said retaining element remains attached to the body, said carrier having a recess opening in said axial direction within which said portion of the retaining element is received, and said carrier having a wall extending along and defining said recess and adapted to engage the element upon rotation in different directions to limit said rotation.

7. A tong tool comprising a pair of pipe gripping jaws, a lever pivotally connected to said jaws and operable to tighten the jaws about a pipe and then rotate them to effect rotation of the pipe, each of said jaws containing a partial cylindrical recess extending axially of the pipe and open along an inner side facing the pipe, a pair of gripping units carried by the jaws respectively each having a partial cylindrical portion received and guided for rotational movement in one of said recesses and having an inner pipe gripping face, each recess having a closed end and an opposite open end through which said unit is slidable in an axial direction out of engagement with the body, and a pair of retaining elements each removably attached to one of the jaws and having a portion extending across the open end of the corresponding recess to maintain one of the units against removal therefrom, each of said units having an end recess facing in the same axial direction as the open end of the corresponding jaw recess and receiving said portion of the retaining element, and each unit having a wall extending along and defining said last mentioned recess and adapted to engage the corresponding retaining element upon rotation in different directions to limit said rotation.

8. A tong tool comprising a pair of pipe gripping jaws, a lever pivotally connected to said jaws and operable to tighten the jaws about a pipe and then rotate them to effect rotation of the pipe, each of said jaws containing a partial cylindrical recess extending axially of the pipe and open along an inner side facing the pipe, a pair of gripping units carried by the jaws respectively each having a partial cylindrical portion received and guided for rotational movement in one of said recesses and having an inner pipe gripping face, each recess having a closed end and an opposite open end through which said unit is slidable in an axial direction out of engagement with the body, and a pair of circular retaining elements each removably attached to one of the jaws and having a portion extending across the open end of the corresponding recess to maintain one of the units against removal therefrom, each of said units having an arcuate end recess facing in the same axial direction as the open end of the corresponding jaw recess and receiving said portion of the retaining element, and each unit having an arcuate wall of a radius greater than said retaining elements extending along and defining said last mentioned recess and adapted to engage the corresponding retaining element upon rotation in different directions to limit said rotation, each of said gripping units comprising a carrier and a plurality of gripping elements removably received within a slot in the carrier and slidable therefrom at the open end of the corresponding jaw recess while the carrier is retained therein by said retaining element.

WILLY H. SPIRI.

REFERENCES CITED

The following references are of record in the file of this patent:

UNITED STATES PATENTS

| Number | Name | Date |
|---|---|---|
| 240,067 | Worden | Apr. 12, 1881 |
| 242,130 | Hurlbut | May 31, 1881 |
| 1,412,143 | Steen et al. | Apr. 11, 1922 |
| 1,483,486 | Scott | Feb. 12, 1924 |
| 1,661,229 | Montgomery | Mar. 6, 1928 |
| 2,407,990 | Lurie | Sept. 24, 1946 |
| 2,417,085 | Mullinix | Mar. 11, 1947 |
| 2,520,448 | Abegg | Aug. 29, 1950 |